(12) United States Patent
Ezaki

(10) Patent No.: US 6,201,544 B1
(45) Date of Patent: Mar. 13, 2001

(54) LOCATION FLOOR NUMBER DISPLAY DEVICE IN NAVIGATION APPARATUS

(75) Inventor: Toru Ezaki, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/132,010

(22) Filed: Aug. 10, 1998

(30) Foreign Application Priority Data

Aug. 11, 1997 (JP) .................................................. 9-216279

(51) Int. Cl.⁷ ................................................ G06T 11/40
(52) U.S. Cl. .................... 345/425; 345/433; 345/439; 345/427; 345/355; 345/357
(58) Field of Search .................................. 345/419, 433, 345/353, 969, 357, 425, 439, 427

(56) References Cited

U.S. PATENT DOCUMENTS

| | | | |
|---|---|---|---|
| 5,602,564 | * 2/1997 | Iwamura et al. | 345/419 |
| 5,748,109 | * 5/1998 | Kosaka et al. | 345/433 |
| 5,784,059 | * 7/1998 | Morimoto et al. | 345/353 |
| 5,956,039 | * 9/1999 | Woods et al. | 345/419 |
| 5,958,012 | * 9/1999 | Battat et al. | 345/969 |

* cited by examiner

Primary Examiner—Mark Zimmerman
Assistant Examiner—Kimbinh T. Nguyen
(74) Attorney, Agent, or Firm—Brinks Hofer Gilson & Lione

(57) ABSTRACT

A detailed map is displayed on a display screen by using detailed map information. When a building BL on the detailed map is indicated, a user name list of the building is calculated from building information to display the user name list on a part of the display screen, and a detailed map MP displayed on another part of the display screen is inclined by a birds-eye process to be displayed. The indicated building BL is displayed three-dimensionally with a height corresponding to the number of its floors. When a user is specified from the user name list, the floor number of a floor on which the user is located is calculated from the building information. The floor is displayed by an L-shaped mark FL in the three-dimensionally displayed building such that the number of floors can be identified, and/or the floor number is displayed by the characters FLC.

30 Claims, 14 Drawing Sheets

LOCATION FLOOR NUMBER DISPLAY DEVICE IN NAVIGATION APPARATUS

BACKGROUND OF THE INVENTION

1. Field of the Invention

The present invention relates to a location floor number display method in a navigation apparatus and, more particularly, to a location floor number display method which visually displays the floor number of a floor, in a building, on which a target institution is located and displays detailed information of the target institution.

2. Description of the Related Art

A navigation apparatus which provides travel guidance for a vehicle to enable a driver to easily reach a target location detects the position of the vehicle, reads map data of the area surrounding the vehicle position from a CD-ROM, draws a map image on a display screen, and draws a vehicle position mark at a predetermined position on the map image in overlapping fashion. In accordance with a change in present position by movement of the vehicle, the vehicle position mark on the screen is moved, or the vehicle position mark is fixed at a predetermined position such as the center of the screen and the map is scrolled, so that the map information of the area surrounding the vehicle position can be always understood at a glance.

The navigation apparatus has a route guiding function which searches a guide route from a starting location to a target location, displays the guide route on a map, and performs intersection guidance (display of an enlarged view of an intersection and a display of the direction to proceed).

A recent navigation apparatus is designed such that various pinpoint searching operations can be performed by using Yellow Page data or detailed town map information. The detailed town map information is detailed map information including the positions and the planar shapes of buildings, roads, and the like such that, with respect to a town, the shapes of buildings, the widths of roads, the positions of signals, the directions of one-way roads, blind alleys, and the like can be realistically depicted.

Regarding Yellow Page data, it is known to provide (1) a telephone number database in which a telephone number is input to search for the institution (various types of stores, sales offices, banks, or the like) of the telephone number and to display the map surrounding the institution; (2) an institution database which includes the names, jobs, positions (longitude/latitude), and the like of institutions (stores, sales offices, banks, and the like) in units of institutions; (3) a building database; and the like. The building database includes detailed information (names, telephone numbers, addresses) of longitude/latitude positions, names, building users (companies, offices, and the like) in units of buildings.

Regarding pinpoint searching, for example, Yellow Page telephone number searching, pinpoint surrounding information searching, Japanese syllabary searching, and the like are used.

The Yellow Page telephone number searching is a method of inputting the telephone number of a target institution to search for the map surrounding the institution and to display the map. A user operates the menu of a remote controller to request telephone number searching. When the user inputs a telephone number of a desired institution (e.g., a department store), a navigation control device calculates the department store name corresponding to the input telephone number with reference to a telephone-number-classified database, calculates position data of the department store with reference to the institution database, and reads the map surrounding the department store on the basis of the position data to display the map on the display screen.

The pinpoint surrounding information searching is a method of searching for a target institution such as a drug store or a coffee shop within a radius of 1 km of a vehicle position or an arbitrary position from a 52-genre job classification to display the map surrounding the target institution. When a user operates the menu of a remote controller to request a map displayed by the surrounding information searching, the navigation control device displays a job-classified list. When the user selects a predetermined job name (e.g., department store), the navigation control device searches department stores within a radius of 1 km of the vehicle position with reference to the institution database to display a department store name list. When the user selects a desired department store name, the navigation control device displays the position of the department store selected with reference to the institution database on the map.

The Japanese syllabary searching is a method of searching the map surrounding an institution by inputting the institution name with Japanese syllables to display the map. When a user operates the menu of a remote controller to request map searching by inputting Japanese syllables, and the name of a desired institution (e.g., department store) is input with Japanese syllables, the navigation control device searches only a part of the name by partial coincidence searching to calculate the department store name with reference to the institution database. The navigation control device calculates the position data of the indicated department store with reference to the institution database, and reads the map surrounding the department store on the basis of the position data to display the map on the display screen.

On the basis of the detailed town map information, a detailed town map is displayed as shown in FIG. 14A, a target building is indicated by a cursor CSR, and "information" is selected from a setup menu. In this case, user names (company names or tenant names) of the building are listed in the order of Japanese syllabary as shown in FIG. 14B with reference to the building database, and a predetermined user is selected from the list. At this time, as shown in FIG. 14C, the name, address, telephone number of the user (company/tenant) are displayed (detailed information display). According to this detailed information display function, a location can be easily checked even if the target institution is in a building. Even in a complicated street lined with buildings, the user does not lose his/her way. More specifically, the building of the target institution can be recognized by the detailed information display function. For this reason, when the building is input as a target location, a guide route to the building is searched and displayed, and the user can reach the target location even in a complicated street lined with buildings without losing his/her way.

As described above, according to the conventional detailed information display function, a route to a building in which a target institution is located can be searched in order to be displayed. However, the floor number of a floor in the building on which the target institution is located cannot be known.

SUMMARY OF THE INVENTION

Therefore, it is a first object of the present invention to display the floor number of a floor, in a building, on which a target institution is located to reliably guide a user to the target institution.

It is a second object of the present invention to display a building three-dimensionally so that the floor number of a floor, in a building, on which a target institution is located is visually and simply displayed.

It is a third object of the present invention to display an actual building three-dimensionally, even if the number of floors in the building is large, without projecting out of the display screen; and to three-dimensionally display a building, even if the number of floors in the building is small, with a proper height.

It is a fourth object of the present invention to display the number of floors in the basement of a building in which a target institution is located to make it possible to easily recognize a location position.

According to the present invention, the first and second objects can be achieved by a location floor number display method of a navigation apparatus comprising the steps of: (1) storing detailed map information including planar shapes of buildings and roads and storing building information including the number of floors of each building, user name (s) for a building, and the floor number of a floor on which a user is located; (2) displaying a detailed map on a display screen by using detailed map information; (3) when a building on the detailed map is indicated, calculating a user name list of the building from the building information to display the user name list on a part of the display screen, and displaying the detailed map on the other part of the screen such that the detailed map is inclined by an imaging process (e.g., birds-eye process), and three-dimensionally displaying the indicated building with a height corresponding to the number of floors; (4) when a user is specified from the user list, calculating the floor number of the floor on which the user is located from the building information; and (5) displaying the floor number in the three-dimensionally displayed building such that the floor number can be identified, or displaying the floor number by characters.

According to the present invention, the first and second objects can also be achieved by a location floor number display method of a navigation apparatus comprising the steps of: (1) storing detailed map information including planar shapes of buildings and roads and storing building information including the number of floors of each building, user name(s) for a building, and the location floor number of a user; (2) displaying a detailed map including a building in which a target institution is located by pinpoint searching on a display screen by using the detailed map information; (3) thereafter, displaying user information of a building user serving as the target institution on a part of the display screen and displaying the detailed map on the other part of the screen such that the detailed map is inclined by an imaging process (e.g., birds-eye process), and three-dimensionally displaying the building with a height corresponding to the number of floors; (4) calculating the floor number of the floor on which the user is located from the building information; and (5) displaying the floor number in the three-dimensionally displayed building such that the floor number can be identified, or displaying the floor number by characters.

According to the present invention, the third object is achieved by a location floor number display method of a navigation apparatus comprising the steps of increasing compressibility as the number of floors of the building increases, and three-dimensionally displaying the building with a height obtained by multiplying the compressibility by the number of floors of the building.

According to the present invention, the fourth object is achieved by a location floor number display method of a navigation apparatus comprising the step of, when a user is located in a basement, displaying a location floor number in the basement by characters.

BRIEF DESCRIPTION OF THE DRAWINGS

DESCRIPTION OF THE PREFERRED EMBODIMENT (a) Three-dimensional Building Display of the Present Invention FIG. 1 depicts a three-dimensional building display according to the present invention. In FIG. 1, reference symbol BL denotes a building in which a target institution (building user) is located; reference symbol FL is an L-shaped mark for visually displaying the floor number of the floor on which a building user serving as the target is located; reference symbol MP is a surrounding map image subjected to a birds-eye process while a height is set to be zero; and reference symbol FLC comprises characters indicating a location floor number.

When the detailed town map MP is displayed on a display screen by using detailed map information including the planar shapes of buildings and roads, and the building BL on the detailed map is indicated, the detailed map is inclined by an imaging process (birds-eye process) for display, and the indicated building BL is three-dimensionally displayed with a height corresponding to the number of floors. When a target institution (building user) is specified, the floor number of a floor on which the user is located is calculated from the building information, and the number of floors is displayed in the building BL with the L-shaped mark FL such that the number of floors can be identified, or the number of floors is displayed by the characters FLC.

(b) Navigation Apparatus

Figure 1:
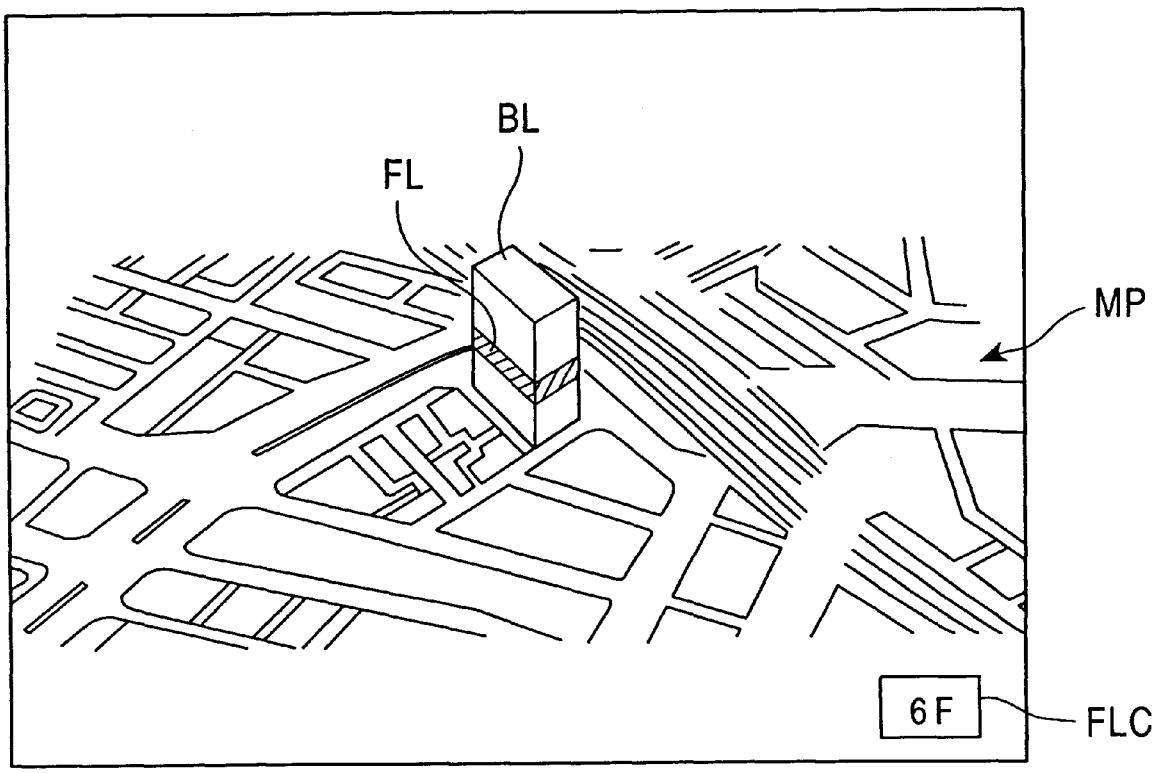
FIG. 1 illustrates a three-dimensional building display of the present invention.
Figure 2:
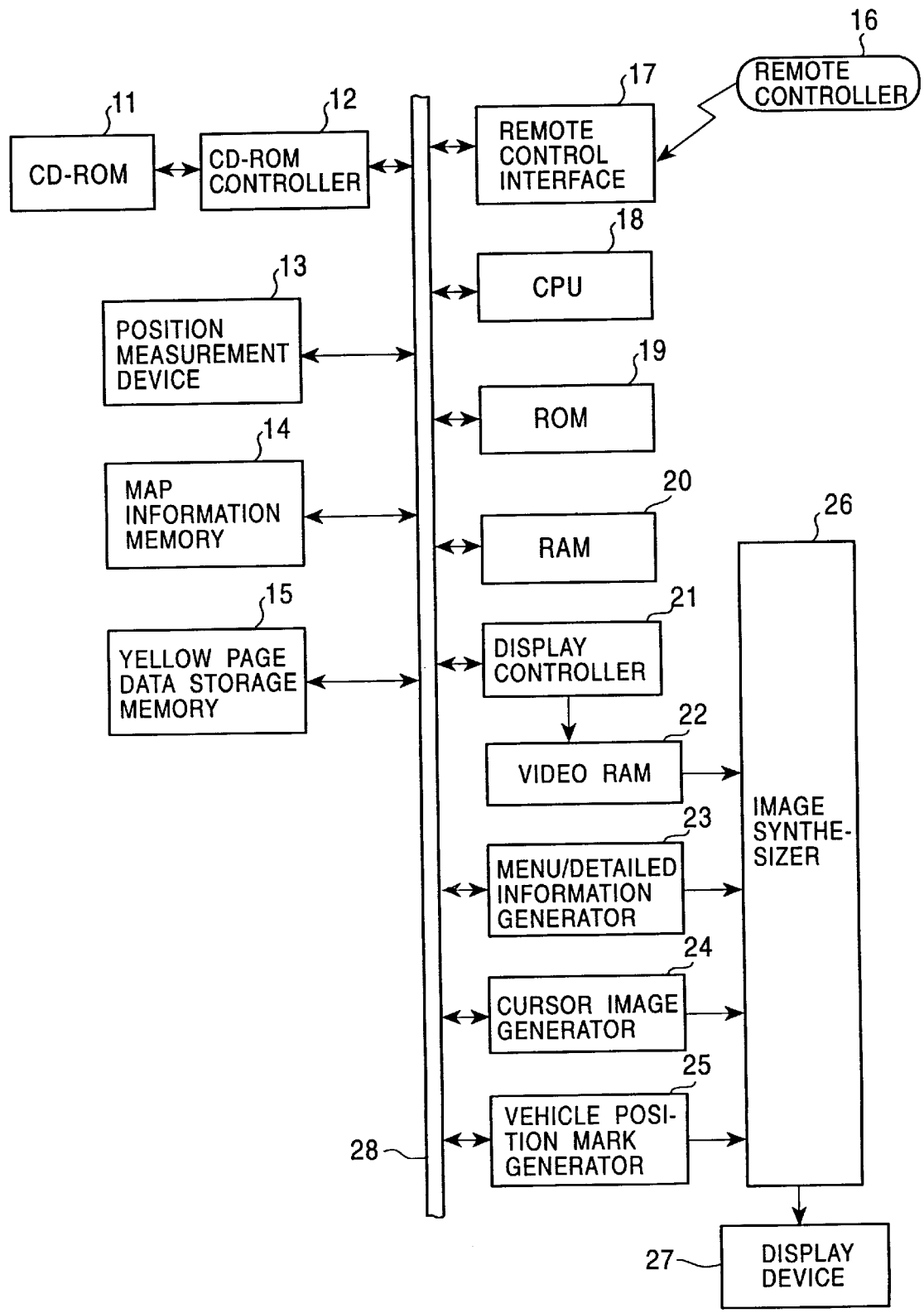
FIG. 2 is a block diagram of a navigation apparatus according to the present invention.

FIG. 2 is a block diagram of a navigation apparatus according to the present invention. Referring to FIG. 2, reference numeral 11 denotes a map storage medium, e.g., a CD-ROM, for storing map information; 12, a CD-ROM controller for controlling the reading of the map information from the CD-ROM; 13, a position measurement device, for measuring the present position of a vehicle, which comprises a vehicle speed sensor for detecting a moving distance, a gyro for detecting a moving azimuth, a GPS, a CPU for calculating a position, and the like. Reference numeral 14 denotes a map information memory for storing the map information read from the CD-ROM; 15, a Yellow Page data storage memory for storing Yellow Page data read from the CD-ROM; 16, a remote controller for performing a menu selecting operation, an enlarging/reducing operation, a manual map scroll operation, and the like; and 17, a remote control interface.

Reference numeral 18 denotes a processor (CPU) for controlling the navigation apparatus as a whole; 19, a ROM for storing various types of programs (guide route searching process, pinpoint searching process, location floor number display process, and the like); 20, a RAM for storing a process result; 21, a display controller for generating a map image; 22, a video RAM for storing the map image generated by the display controller; 23, a menu/detailed information generator for generating a menu image or detailed information in a pinpoint searching process; 24, a cursor image generator; 25, a vehicle position mark generator; 26, an image synthesizer; 27, a display device for displaying an image output from the image synthesizer; and 28, a bus.

(b) Contents of CD-ROM

In addition to regular map information, Yellow Page data, detailed town map information, and the like are recorded on the CD-ROM 11.

(b-1) Regular Map Information

Figure 3:
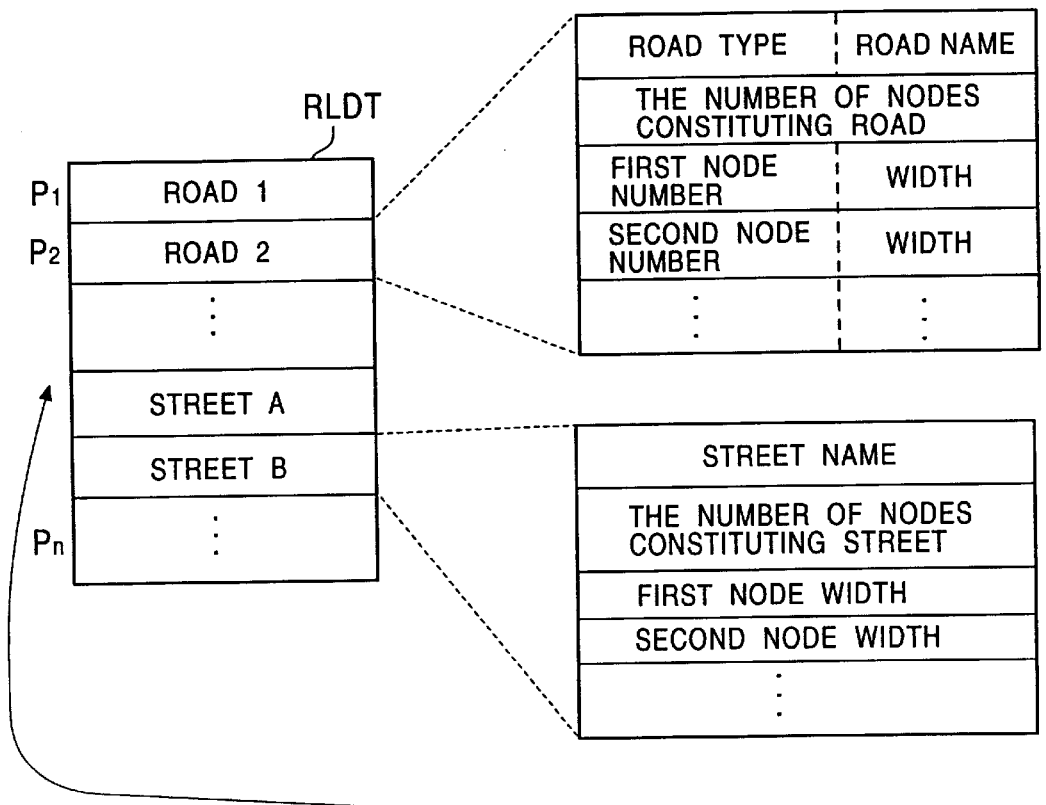
FIG. 3 illustrates the arrangement of road data in a map database.
Figure 3:
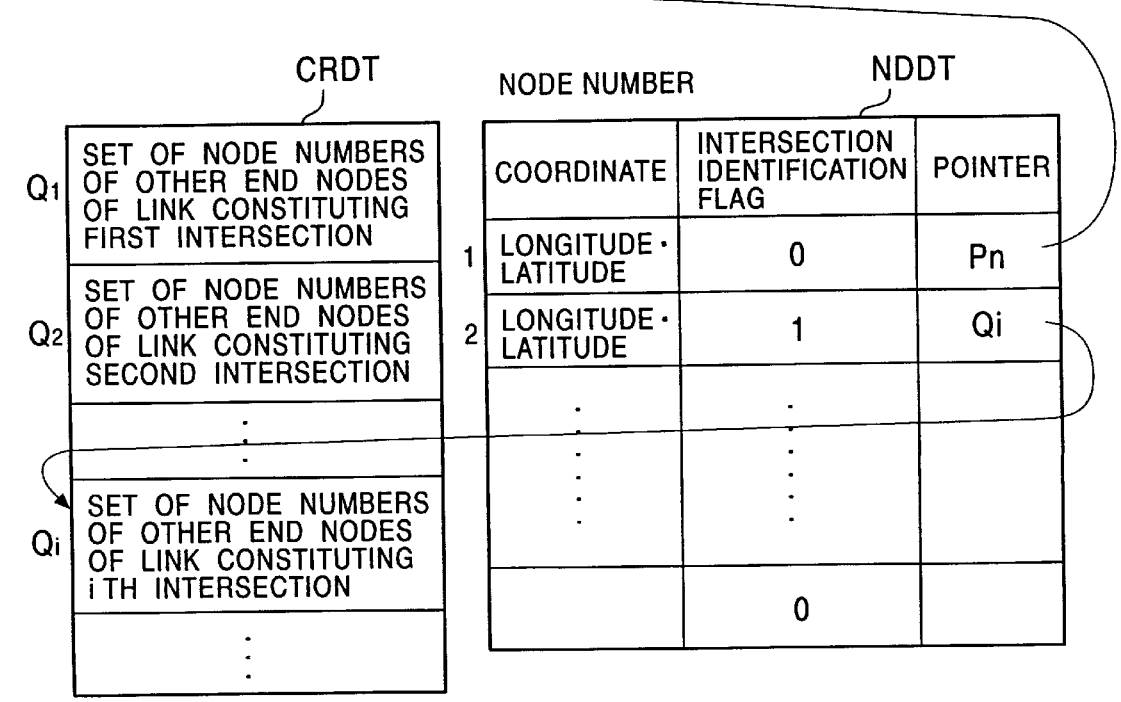

The regular map information includes: (1) a road layer; (2) a background layer for displaying an object on a map; (3) a character layer for displaying city, town, and village names; and (4) an IIS layer for storing IIS (Integrated Information Service) information. Of these layers, the road layer has road link data RLDT, node data NDDT, and intersection data CRDT as shown in FIG. 3.

The road link data RLDT provides attribute information of a corresponding road, and includes data such as the number of all nodes on a road link, the numbers of nodes constituting the road, a road number (road name), and the type of the road (national road, highway, prefectural road, or other road).

The intersection data CRDT is a set of nodes (referred to as intersection constituting nodes), of the nodes connected to each intersection on a map, which are closest to the corresponding intersection. The node data NDDT is a list of all nodes constituting a road, and includes position information (longitude/latitude) of each node, an intersection identification flag representing whether the node is an intersection, and a pointer or the like for indicating intersection data if the node is an intersection or indicating a road link to which the node belongs if the node is not an intersection.

(b-2) Detailed Town Map Information

Figure 4A:
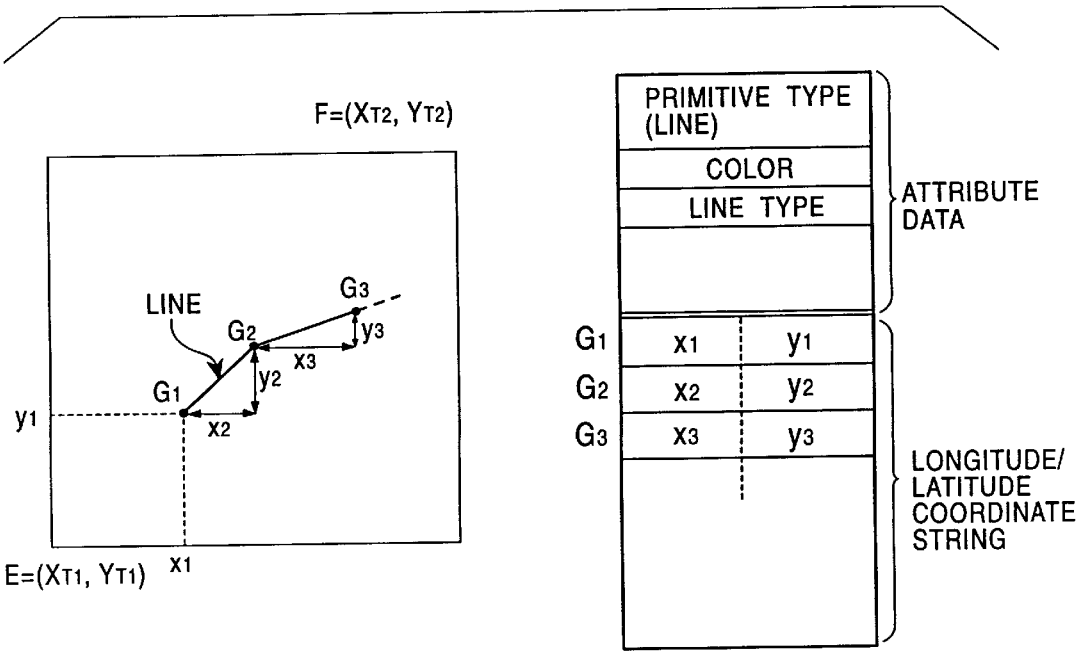
FIG. 4 illustrates detailed map graphic data.
Figure 4B:
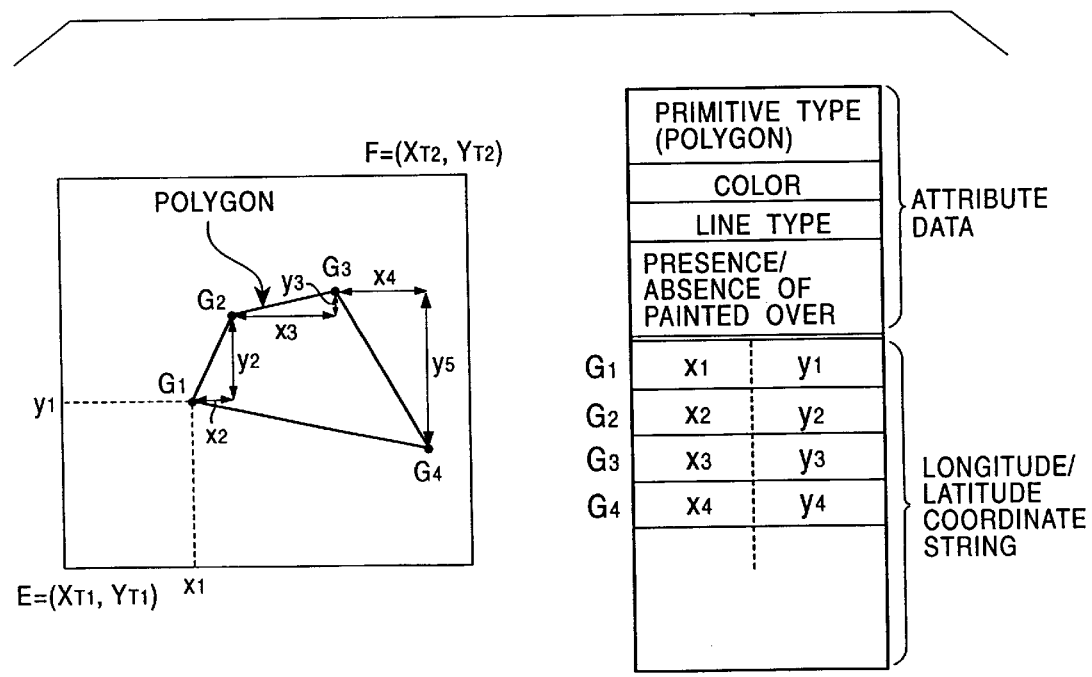
Figure 5:
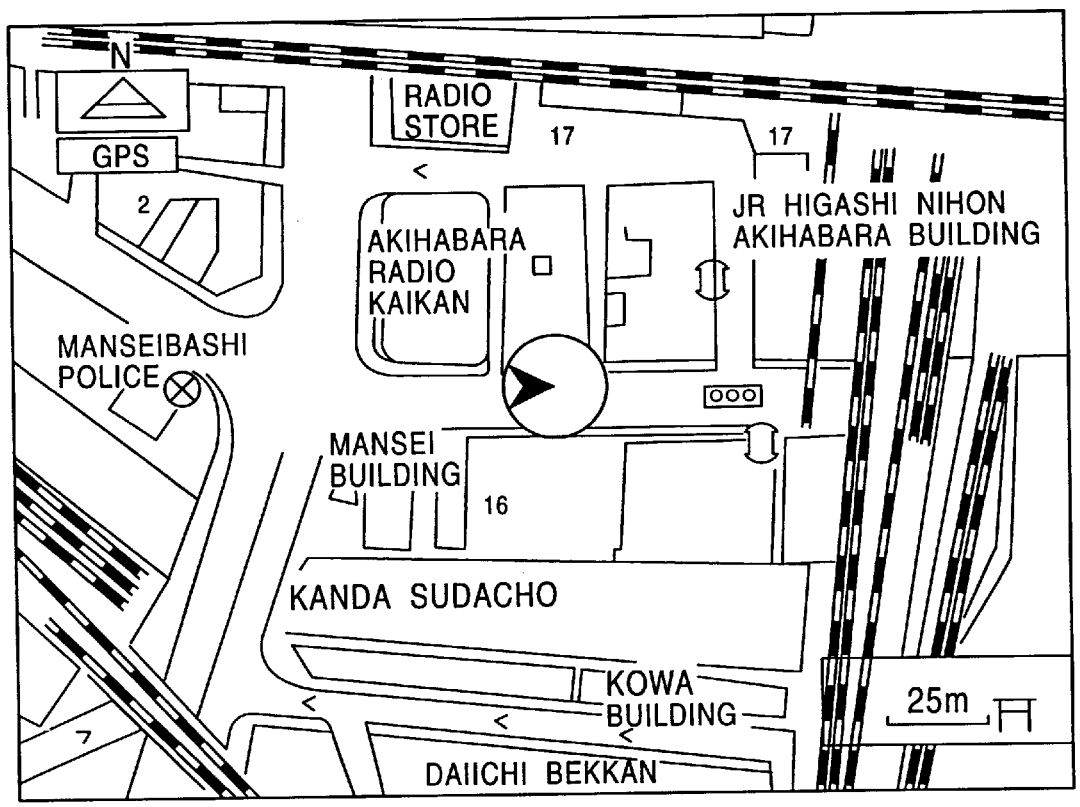
FIG. 5 depicts a detailed town map.

Detailed town map information is divided into units, each of which is divided to have a longitudinal width and a latitudinal width. The range of each unit on absolute longitude/latitude coordinates (X, Y), as shown in FIG. 4, is determined by the absolute longitude/latitude coordinates $(X_{T1}, Y_{T1})$ and $(X_{T2}, Y_{T2})$ of the diagonal corners E and F of the unit. The map graphic data of each unit defines a large number of planar shapes such as roads, buildings, and parks. As shown in FIGS. 4A and 4B, the map graphic data includes, in addition to a line, a primitive type such as a polygon, a color, a line type, and an attribute representing the presence/absence of painted over, and also longitude/latitude coordinate strings $(x_1, y_1), (x_2, y_2), \ldots, (x_n, y_n)$ of element points $G_1$ to $G_n$ such as a change in direction if a line is defined or a vertex if a polygon is defined. By using the detailed map information, the detailed town map surrounding an indicated spot (vehicle position or target location) can be displayed at a scale of 25 m/50 m as shown in FIG. 5.

(b-3) Yellow Page Data

Figure 6:
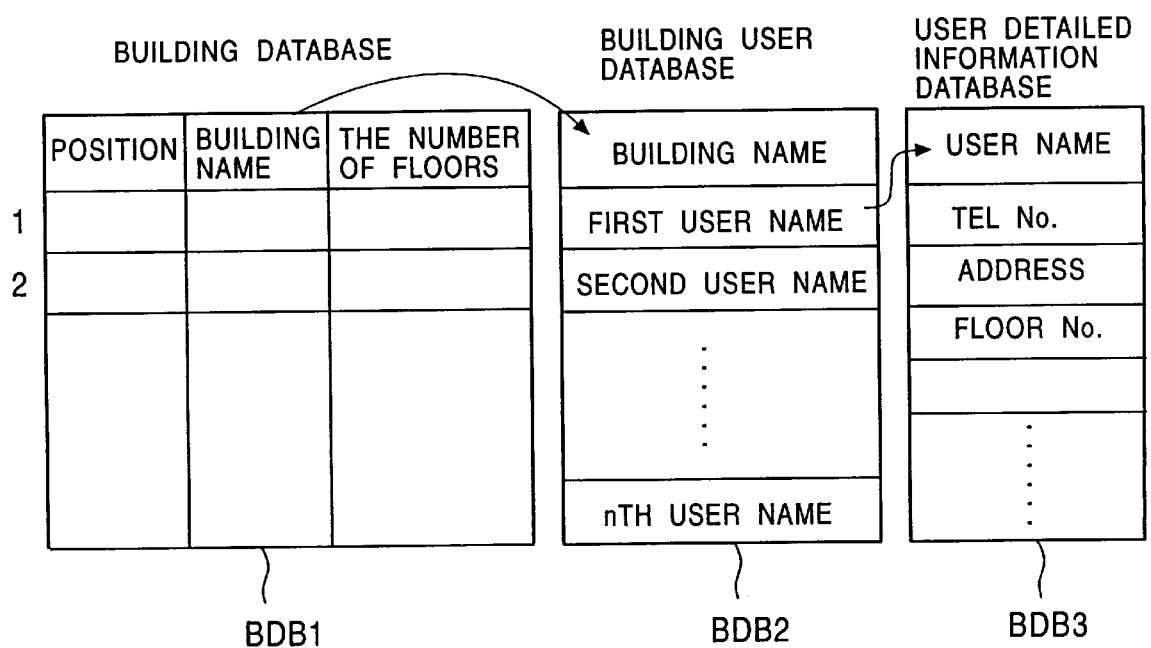
FIG. 6 illustrates building data.

Regarding Yellow Page data, it is known to provide (1) a telephone number database for searching for the institution corresponding to a telephone number by inputting the telephone number to display the map surrounding the institution; (2) an institution database which includes the names, jobs, longitude/latitude positions, and the like of institutions; (3) a building database; and the like. The building database provides the detailed information of buildings. As shown in FIG. 6, the building database has a hierarchical structure defined by a building database BDB1, which is related to a building user database BDB2, which is related to a detailed user information database BDB3.

The building database BDB1 includes the longitude/latitude position, the name, and the number of floors of each building. The building user database BDB2 includes the user name (company/tenant name) of the building. The detailed user information database BDB3 includes the detailed information of a user, i.e., a user name, a telephone number, an address, the location floor number of the user, and the like.

(c) Location Floor Number Display Method using Detailed Building Information

Figure 7:
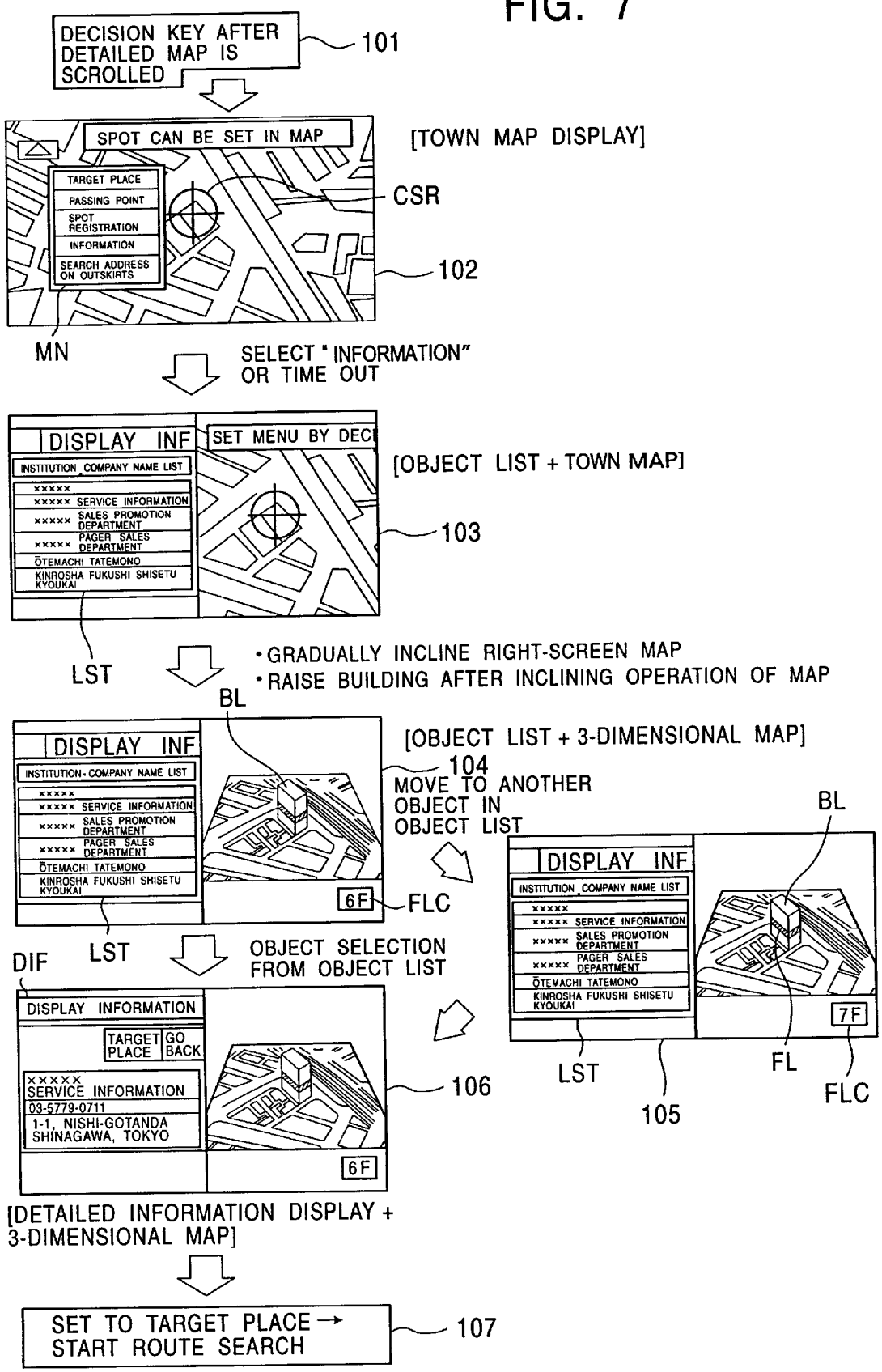
FIG. 7 depicts a location floor number display process using detailed building information according to the present invention.

FIG. 7 depicts the sequence of a location floor number display method using detailed building information according to the present invention.

A cursor is positioned in the vicinity of a target location by using the regular map, and a town map display is selected. With this operation, the display controller 21 generates the town map image surrounding the target location, by using the detailed town map information of the area surrounding the target location to display the town map on a display screen. The town map is scrolled by operating the remote controller 16 to display a target building. The building indicated by the cursor CSR is selected by pressing a decision key. These operations are conducted in step 101.

By pressing the decision key, the menu/information generator 23 generates a setup menu MN in order to display the setup menu MN on the map such that the setup menu MN overlaps the map. In this manner, when a predetermined item of the setup menu MN is selected, route searching is performed by using a spot (building) indicated by the cursor as a target location, the spot is registered as a passing point, spot registration is performed, or the detailed building information can be displayed. These operations are included in step 102.

When "information" is selected from the setup menu by a remote control operation, or when a set period of time has elapsed without any operation, the menu/information generator 23 is started. The menu/information generator 23 calculates a user name list (object list) of a building indicated by the cursor CSR from the building database stored in the Yellow Page data memory 15, and displays a user name list LST of the building in the order of Japanese syllabary on the left half of the screen in place of the setup menu. These operations are included in step 103.

Figure 8:
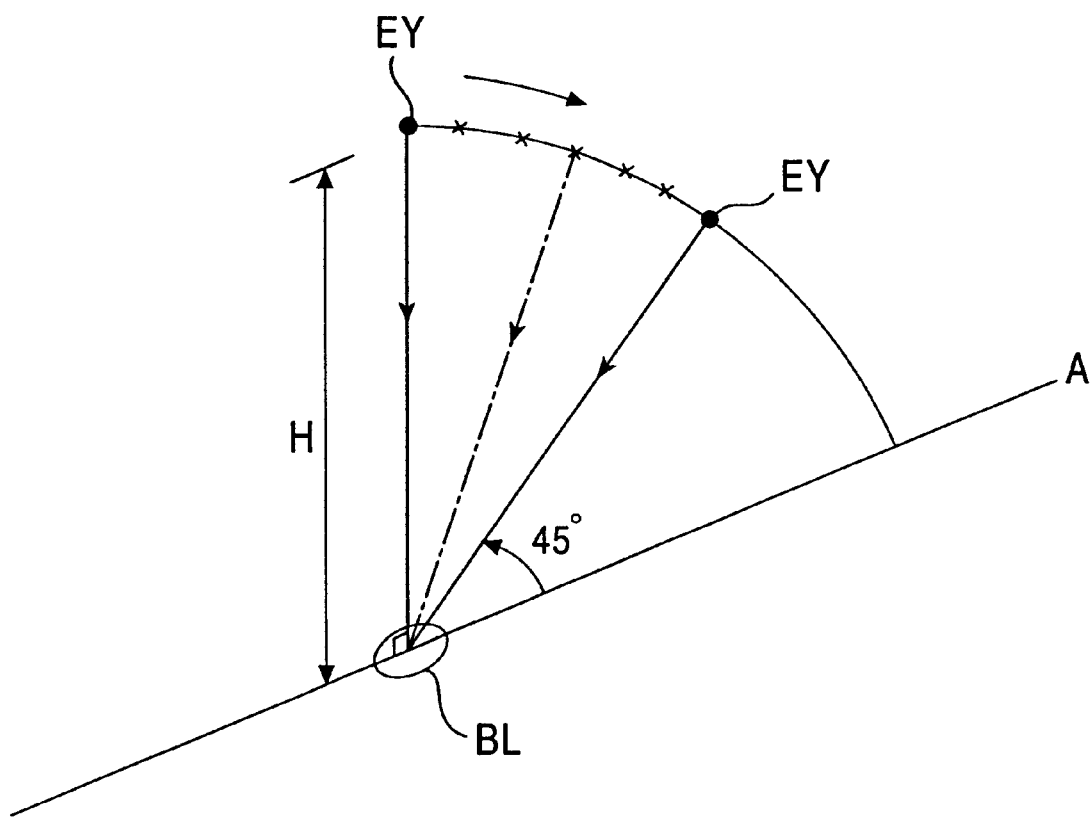
FIG. 8 illustrates a viewpoint position according to a birds-eye process.
Figure 9A:
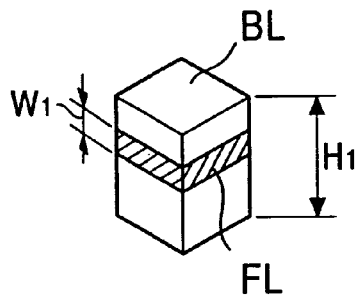
FIG. 9 depicts a building display.
Figure 9B:
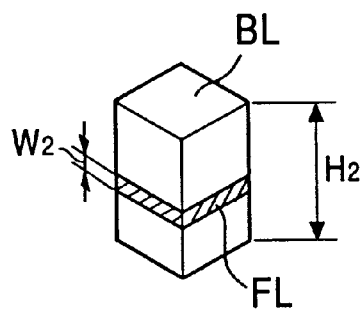
Figure 9C:
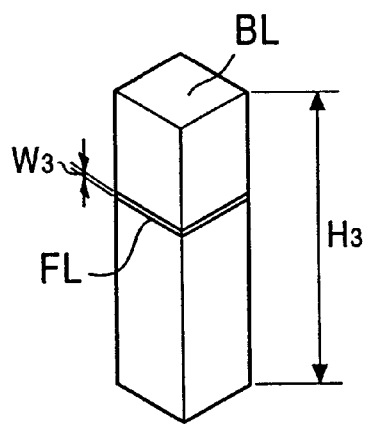
Figure 9D:
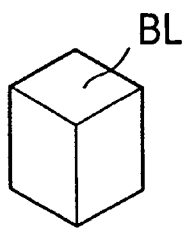

The display controller 21 performs a birds-eye process (to be described later) on the town map displayed on the right half of the screen and displays the town map such that the map image is gradually inclined. For example, as shown in FIG. 8, the map is sequentially rotated in a predetermined direction (A direction) while a distance H from a position above an indicated building BL to the building is kept constant and a viewpoint EY faces the ground; the birds-eye process is performed at multiple viewpoint positions (x-mark positions) by using the planar shape data of the buildings and roads; and the town map is displayed on the basis of the shape data subjected to the birds-eye process. The process is performed until a straight line connecting the viewpoint to the building and the ground make 45°; thus, the town map is displayed such that the town map is gradually inclined.

Upon the completion of the inclining operation, the display controller 21 calculates the number of floors in the building indicated by the cursor CSR from the building database, generates the building image with a height corresponding to the number of floors, and displays the building BL three-dimensionally.

The display controller 21 calculates the floor number of a floor on which is located a user who is selected (displayed to be highlighted) from the user name list LST from the building database; displays the floor by an L-shaped mark FL in the three-dimensional building BL such that the number of floors can be identified; and, at the same time, the floor number (6F) is displayed by the characters FLC. The floor number may also be displayed by only one of either the L-shaped mark or the characters FLC. These operations are included in step 104.

The three-dimensional display of the building is performed in the following manner. A vertical compressibility factor $\alpha$ is increased as the number of floors Ft of the building increases, and the planar shape of the building is raised from the ground up to a height H ($=$Ft·$\alpha$) obtained by multiplying the number of floors of the building by the compressibility factor. The width W of the L-shaped mark FL is a value ($=$H/Ft) obtained by dividing the height H of the building by the number of floors, and a mark drawing position is the position having a height h ($=$F·H/Ft) where the floor number of the user is represented by F. The floor numbers of buildings are classified into three sections, i.e., 1st to 10th floors, 11th to 30th floors, and 31st or more floors. The vertical compressibilities of the sections are represented by $\alpha_1$, $\alpha_2$, and $\alpha_3$, respectively, and the compressibility of the section in which the number of floors is large is made higher ($\alpha_1 < \alpha_2 < \alpha_3$). In this manner, the building, even if the number of floors of the actual building is large, can be displayed without projecting out of the display screen; and the building, even if the number of floors is small, can be three-dimensionally displayed with a proper height.

FIG. 9 illustrates examples of buildings in consideration of the above circumstances. When a user is located in a basement, as shown in FIG. 9D, the building is three-dimensionally displayed without displaying the L-shaped mark, and the floor number in the basement on which the user is located is displayed, e.g., the "second basement".

A target building user name is selected (displayed to be highlighted) on the user name list LST by a remote control operation. In this manner, the floor number of the floor on which the new selected user is located is calculated from the building database, and the floor number is displayed in the three-dimensional building BL by the L-shaped mark FL such that the floor number can be identified. At the same time, the floor number (7F) is displayed by the characters FLC. These operations are included in step 105.

When the decision key of the remote controller is operated in this state, the navigation apparatus calculates the detailed information (user name, telephone number, and address) DIF of the selected user from the building database to display the detailed information on the left side of the display screen in place of the user name list LST. In this manner, the number of a floor, in the building, on which a target institution is located can be checked, and the address and the telephone number can be obtained. These operations are included in step 106.

When a building (spot indicated by cursor) is set as a target place, the CPU begins to search for an optimum route from the vehicle position to the target place. These operations are included in step 107.

(d) Another Location Floor Number Display Process using Detailed Building Information The embodiment in FIG. 7 describes a case wherein a building is specified, and then a user name is specified. However, when pinpoint searching is performed by telephone number searching or Japanese syllabary searching, a town map including a building in which a target institution (building user) is located is displayed. In this case, the user already has been determined, and a new user name need not be specified.

Figure 10:
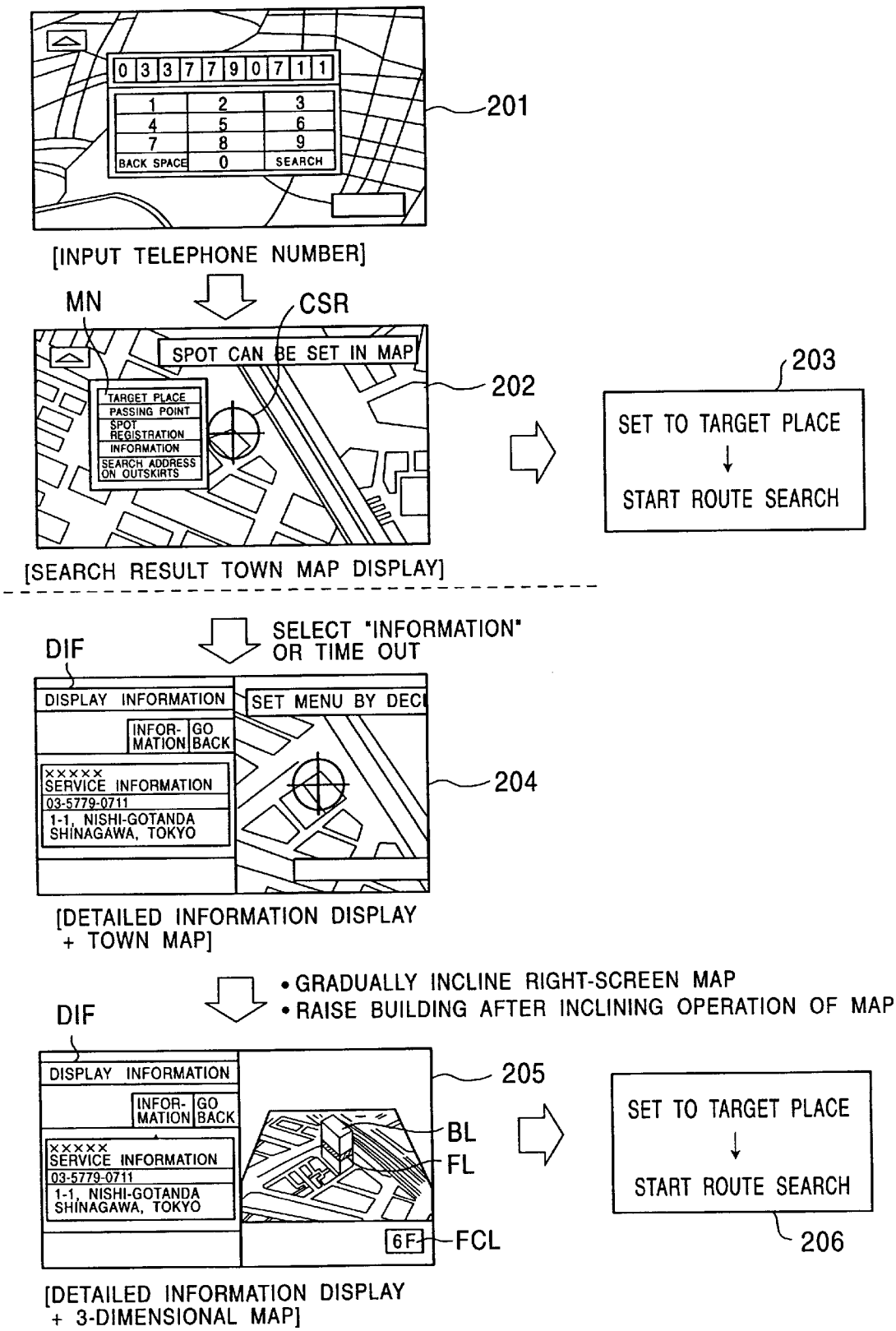
FIG. 10 depicts another location floor number display process using detailed building information according to the present invention.

FIG. 10 illustrates another location floor number display process using detailed building information according to the present invention in the case wherein a user has been determined as described above, and a new user name need not be specified.

Telephone number searching is selected by operating the menu of a remote controller to display a telephone number searching screen. Thereafter, the telephone number of a target institution is input. These operations are included in step 201.

By inputting a telephone number, the CPU 18 calculates the institution name corresponding to the input telephone number with reference to a telephone-number-classified database stored in the Yellow Page data memory 15. The CPU 18 calculates the position data of the institution with reference to the institution database, and reads the detailed town map information of the area surrounding the institution into the map information memory 14 on the basis of the position data. The display controller 21 controls the display screen to display a town map having a target institution or a building in which the target institution is located at the center of the screen. It is assumed that the building in which the target institution is located is displayed at the center of the screen, and that the building is indicated by the cursor CSR.

While the above operation is performed, the menu/information generator 23 generates and displays the setup menu MN on the map such that the setup menu MN overlaps the map. In this manner, a predetermined item of the setup menu MN can be selected: to perform route searching by using a spot (building) indicated by a cursor as a target place, the spot is registered as a passing point, spot registration is performed, or the detailed building information can be displayed. These operations are included in step 202.

In this state, when "target place" in the setup menu MN is selected by a remote control operation, route searching is started by using the cursor position as a target place. These operations are included in step 203.

On the other hand, when "information" is selected from the setup menu MN by a remote control operation, or when a set period of time has elapsed without any operation, the menu/information generator 23 is started. The menu/information generator 23 calculates detailed information DIF including the name, telephone number, address, and location floor number F of a target institution (building user) from the building database stored in the Yellow Page data memory 15, and displays the name, telephone number, and the address on the left side of the display screen. These operations are included in step 204.

The display controller 21 applies a birds-eye process to the town map displayed on the right half of the display screen (as in step 104 in FIG. 7) and displays the town map such that the map image is gradually inclined. Upon completion of the inclining operation, the display controller 21 calculates the number of floors of the building indicated by the cursor CSR from the building database, generates the building image with a height corresponding to the number of floors, and displays the building BL three-dimensionally. The display controller 21 displays the floor number in the three-dimensional building BL by the L-shaped mark FL on the basis of the floor number F of a floor on which a user is located such that the floor number can be identified, and, at the same time, the floor number (6F) is displayed by the characters FLC. The floor number may also be displayed by only one of either the L-shaped mark or the characters. These operations are included in step 205.

When a building (spot indicated by cursor) is set as a target place, the CPU 18 begins to search an optimum route from the vehicle position to the target place. These operations are included in step 206.

(e) Birds-eye Process

Figure 11A:
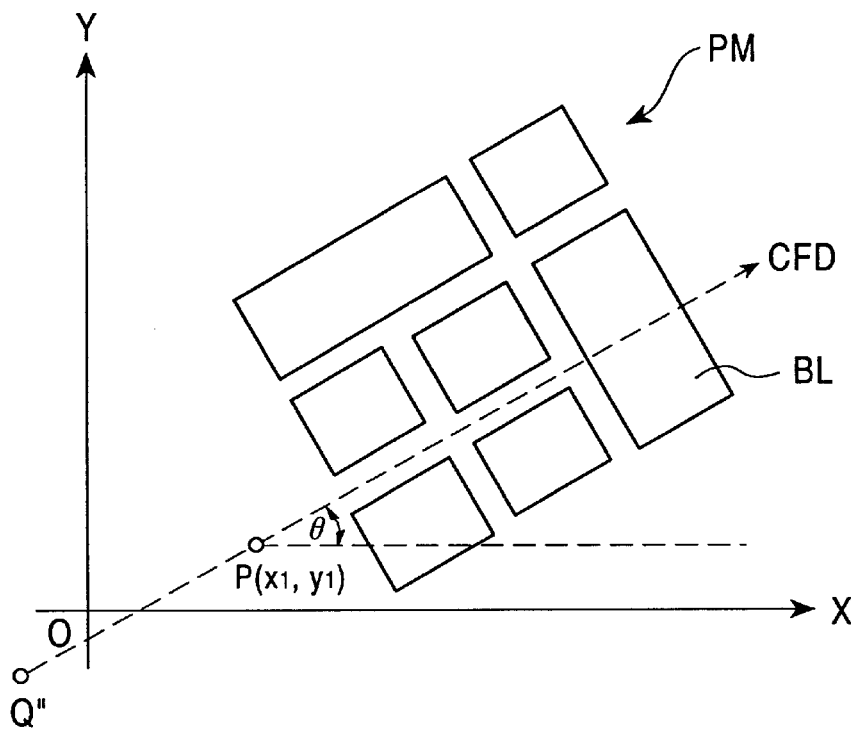
FIG. 11 illustrates a birds-eye process (part 1).
Figure 12A:
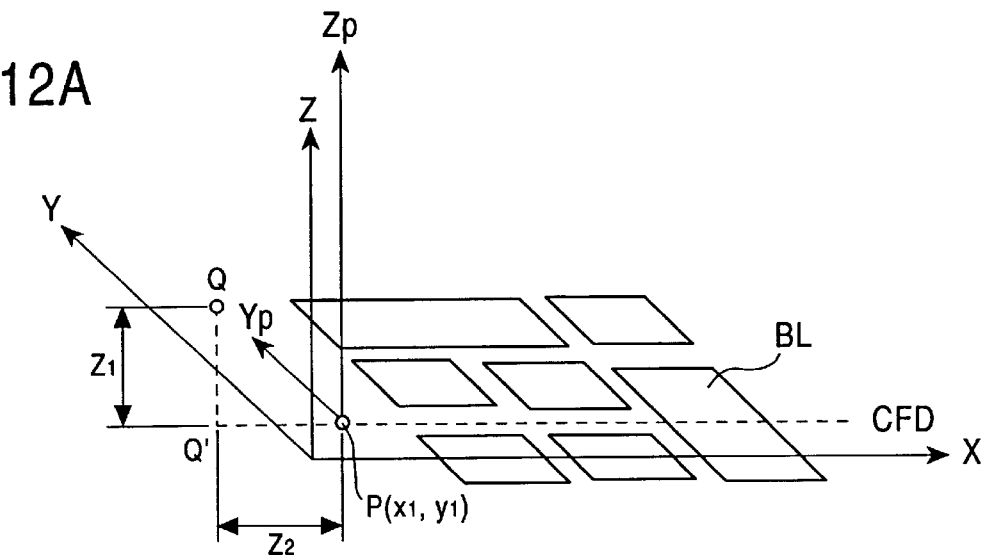
FIG. 12 illustrates a birds-eye process (part 2).
Figure 12B:
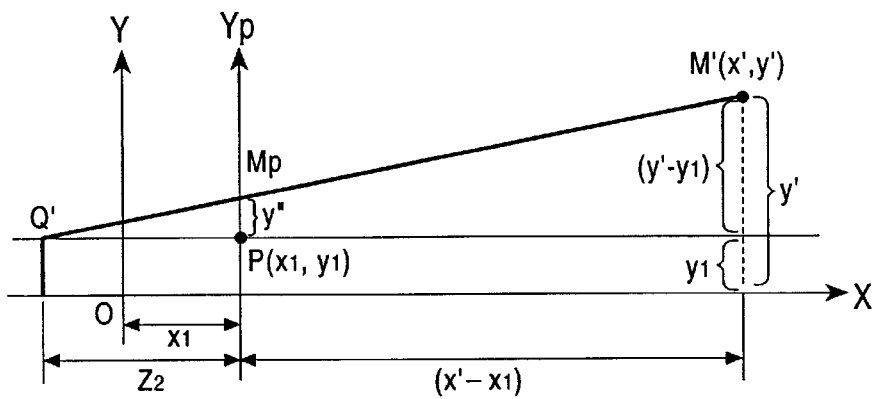
Figure 12C:
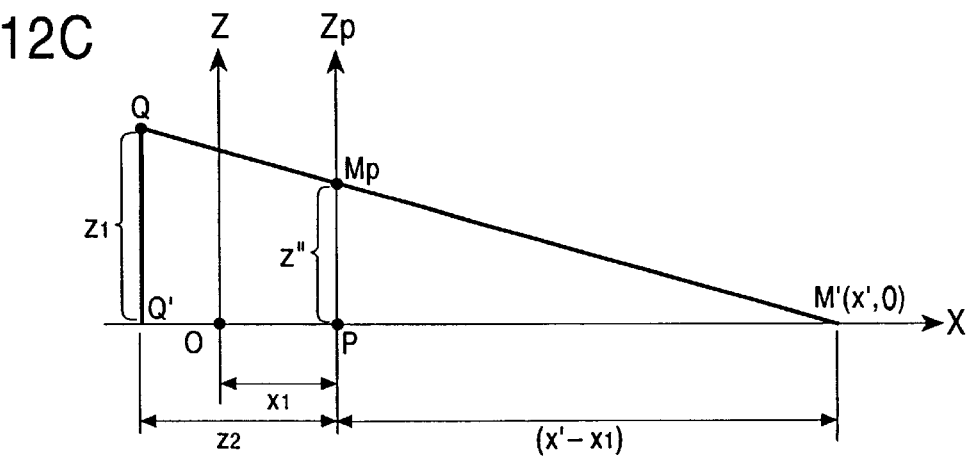
Figure 13:
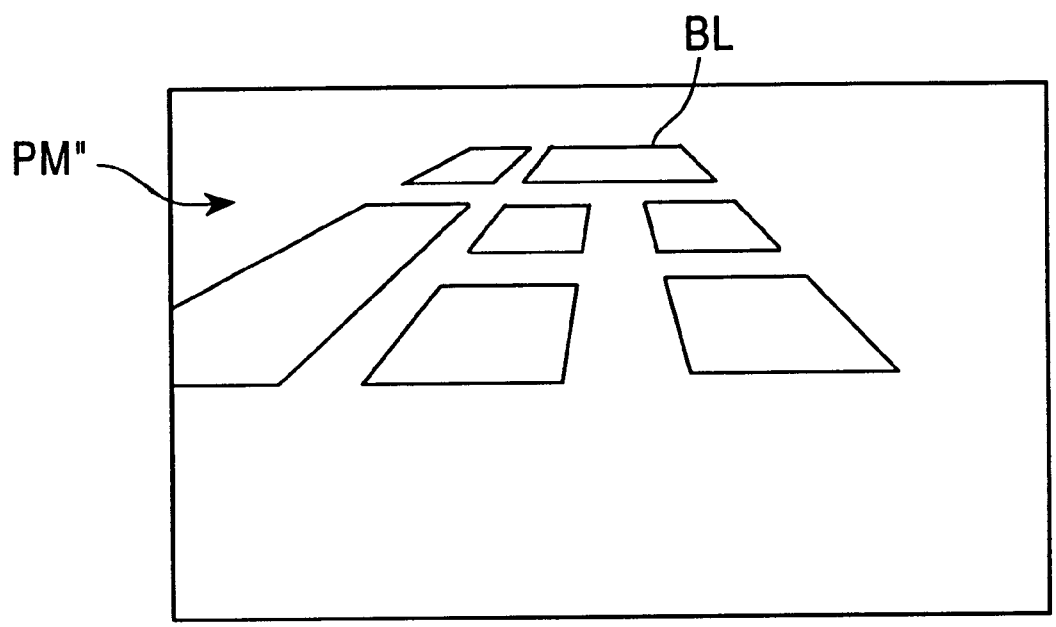
FIG. 13 illustrates a birds-eye view.
Figure 14A:
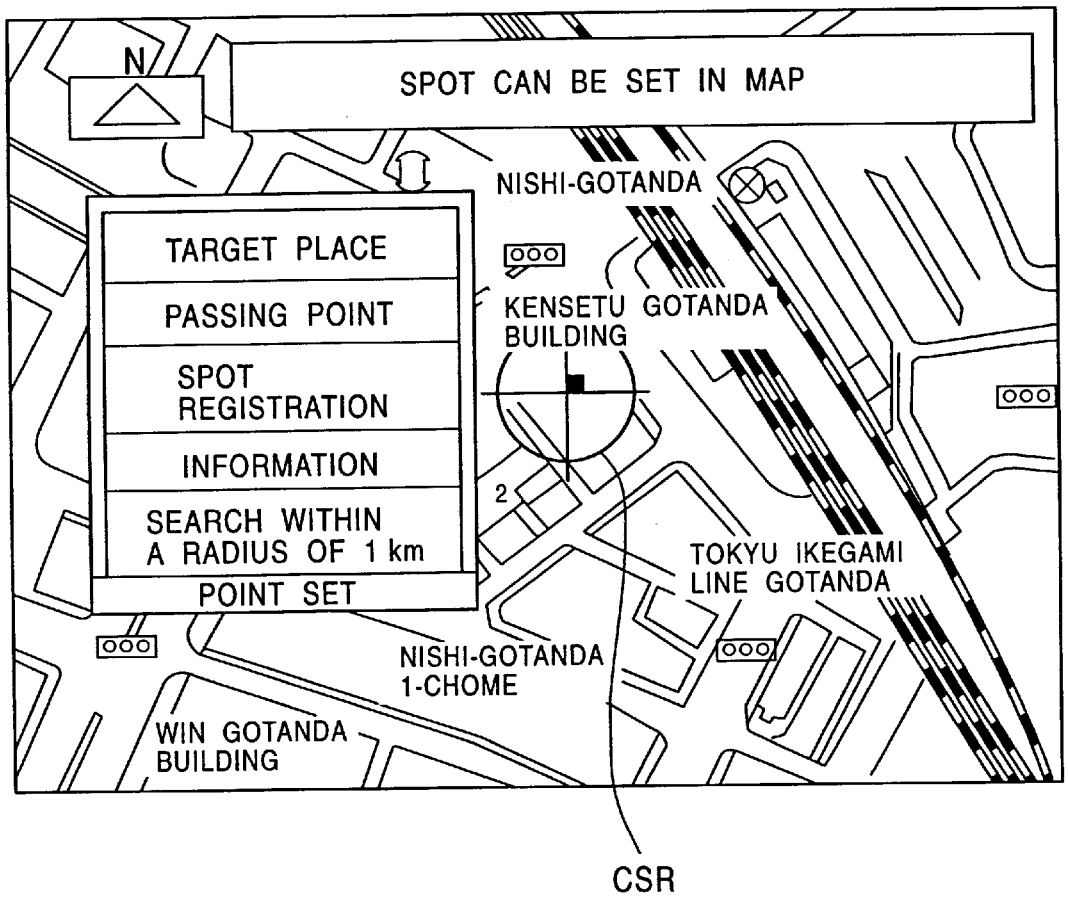
FIG. 14 depicts a conventional detailed information display.
Figure 14B:
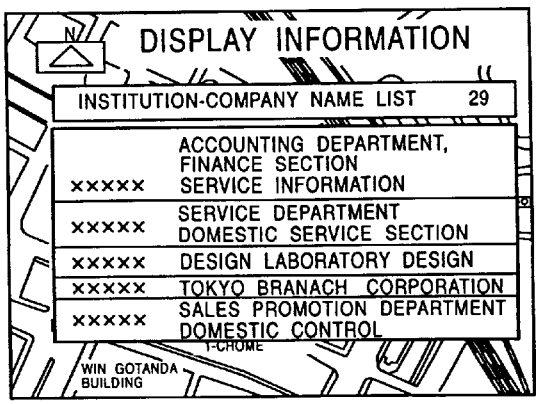
Figure 14C:
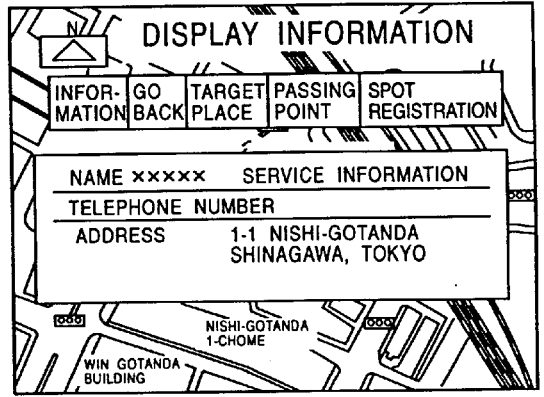

FIGS. 11 to 13 are illustrations for explaining a birds-eye process, and display a birds-eye view obtained when a point above a point Q" located behind a point P($x_1$, $y_1$) is regarded as the viewpoint, and the building BL is viewed from the viewpoint in a direction CFD.

A planar map (planar shapes of buildings and roads) PM is rotated about the point P ($x_1$,$y_1$) by $\theta°$. More specifically, map data (x,y) are subjected to a rotational coordinate transformation process by the following equation:

[Equation 1]

$$\begin{pmatrix} x' \\ y' \end{pmatrix} = \begin{pmatrix} \cos\theta & -\sin\theta \\ \sin\theta & -\cos\theta \end{pmatrix} \begin{pmatrix} x - x_1 \\ y - y_1 \end{pmatrix} + \begin{pmatrix} x_1 \\ y_1 \end{pmatrix}. \quad (1)$$

Figure 11B:
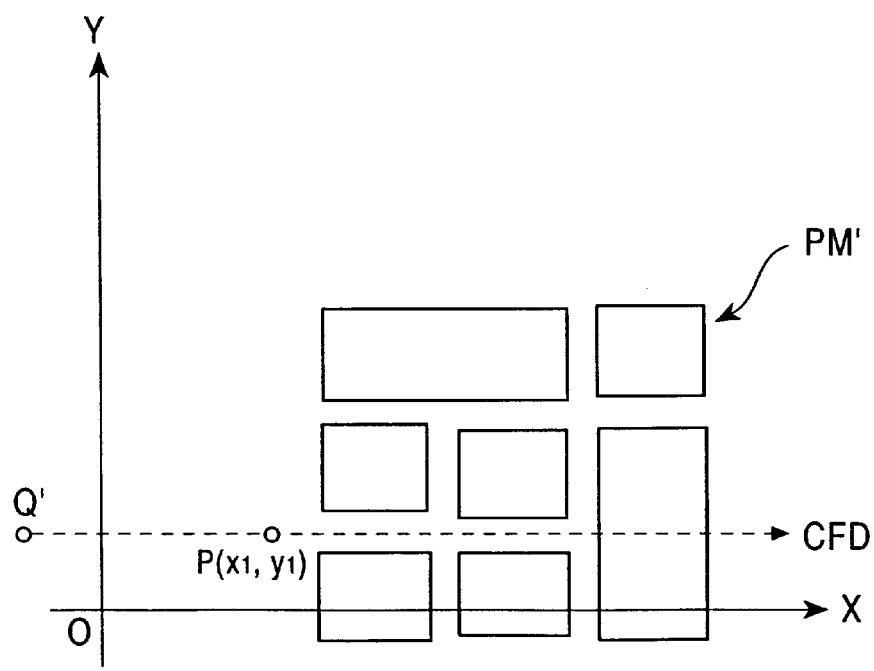

FIG. 11B is a planar map PM' obtained after this coordinate transformation.

Thereafter, the following projection transformation process is performed behind the point P by using the direction CFD as the direction of a line of sight while a point Q (FIG. 12A) having a predetermined height is regarded as the viewpoint. As shown in FIG. 12A, a point Q ($x_1-z_2$,$y_1$,$z_1$) which is at a point $z_2$ behind the point P and has a height $z_1$ is the viewpoint position.

When the rotated map is viewed from the viewpoint Q, position data z" and y" of a point where the line of sight crosses a Yp-Zp plane are calculated by the projection transformation process. Transformation equations for calculating z" and y" are given by the following equations:

$$z''=z_1(x'-x_1)/(x'-x_1+z_2) \quad (2)$$

$$y''=z_2(y'-y_1)/(x'-x_1+z_2) \quad (3)$$

Because of this, map data (x', y') of all rotated points which are present before the viewpoint within a view angle of ±45° are transformed by equations (2) and (3) into a coordinate value (y",z") of a Yp-Zp coordinate system.

Equations (2) and (3) can be obtained in the following manner with reference to FIGS. 12B and 12C. More specifically, with reference to FIG. 12B, a Yp-axis coordinate value y" of an arbitrary point M' (x',y') after rotation on the Yp-Zp plane satisfies the following equation by the similarity of triangles:

$$(x'-x_1+z_2):(y'-y_1)=z_2:y''.$$

Therefore, when y" is calculated, equation (3) can be obtained. With reference to FIG. 12C, a Zp-axis coordinate value z" of an arbitrary point M' after rotation on the Yp-Zp plane satisfies the following equation by the similarity of triangles:

$$(x'-x_1+z_2):z_1=(x'-x_1):z''.$$

Therefore, when z" is calculated, equation (2) can be obtained. When the projection transformation process is completed as described above, a birds-eye view is generated by using the obtained graphic data (y",z") to display the birds-eye view. FIG. 13 illustrates the resulting birds-eye view.

Although the present invention has been described above with reference to the preferred embodiment, various modifications of the present invention can be effected without departing from the spirit and scope of the invention, and the present invention does not exclude these modifications.

As described above, according to the present invention, since the floor number in a building on which a target institution is located is displayed, a user can be reliably guided to the target institution.

According to the present invention, a building is displayed three-dimensionally, and the location floor number of a target institution is displayed by an L-shaped mark in the three-dimensional building. Therefore, the presence/absence of the target institution in the building and the floor number of a floor on which the target institution is located can be visually and simply displayed.

According to the present invention, an actual building, even if the number of floors in the actual building is large, can be displayed without projecting out of the display screen, and a building, even if the number of floors in the building is small, can be three-dimensionally displayed with a proper height.

According to the present invention, even if a target institution is located in the basement of a building, the floor number in the basement is displayed, and the location position of the target institution can be easily recognized.

What is claimed is:

1. A location floor number display method in a vehicle navigation apparatus for displaying the floor number of a floor, in a building, on which a building user serving as a target institution is located, comprising the steps of:

storing map information including shapes of buildings and storing building information including the number of floors of each building, user name(s) in a building, and the location floor number of the user(s);

displaying a map on a display screen by using the map information;

when a building on the map displayed on the display screen is indicated, calculating a user name list of the building from the building information and displaying the user name list on the display screen;

when a user is specified from the user list, calculating the floor number of the floor on which the user is located from the building information; and displaying the indicated building three-dimensionally and displaying the floor of the specified user such that the floor number can be identified, and/or displaying the floor number by characters.

2. A location floor number display method in a navigation apparatus according to claim 1, characterized in that an indicated building is generated and displayed three-dimensionally with a height corresponding to the number of its floors.

3. A location floor number display method in a navigation apparatus according to claim 1, characterized in that a building image is generated and displayed three-dimensionally with a height such that a vertical compressibility factor is increased as the number of floors of the indicated building increases.

4. A location floor number display method in a navigation apparatus according to claim 1, characterized in that, when a user is located in a basement, a location floor number in the basement is displayed by characters.

5. A location floor number display method in a vehicle navigation apparatus for displaying the floor number of a floor, in a building, on which a building user serving as a target institution is located, comprising the steps of:
- storing map information including shapes of buildings and storing building information including the number of floors of each building, user name(s) in a building, and the location floor number of the user(s);
- displaying a map including a building in which the target institution is located by pinpoint searching on a display screen by using the map information; and
- thereafter, calculating the floor number of the floor on which the user is located from the building information, displaying the indicated building three-dimensionally and displaying the floor of the specified user such that the floor number can be identified, and/or displaying the floor number by characters.

6. A location floor number display method in a navigation apparatus according to claim 5, characterized in that an indicated building is generated and displayed three-dimensionally with a height corresponding to the number of its floors.

7. A location floor number display method in a navigation apparatus according to claim 5, characterized in that a building image is generated and displayed three-dimensionally with a height such that a vertical compressibility factor is increased as the number of floors of the indicated building increases.

8. A location floor number display method in a navigation apparatus according to claim 5, characterized in that, when a user is located in a basement, a location floor number in the basement is displayed by characters.

9. A location floor number display method in a vehicle navigation apparatus for displaying the floor number of a floor, in a building, on which a building user serving as a target institution is located, comprising the steps of:
- storing detailed map information including planar shapes of buildings and roads and storing building information including the number of floors of each building, user name(s) in a building, and the location floor number of the user(s);
- displaying a detailed map on a display screen by using the detailed map information;
- when a building on the detailed map is indicated, calculating a user name list of the building from the building information to display the user name list on a part of the display screen, and displaying the detailed map on another part of the display screen such that the detailed map is inclined by an imaging process, and three-dimensionally displaying the indicated building with a height corresponding to the number of its floors; and
- when a user is specified from the user list, calculating the floor number of the floor on which the user is located from the building information, displaying the indicated building three-dimensionally and displaying the floor of the specified user such that the floor number can be identified, and/or displaying the floor number by characters.

10. A location floor number display method in a navigation apparatus according to claim 9, characterized in that, when a user is located in a basement, a location floor number in the basement is displayed by characters.

11. A location floor number display method in a navigation apparatus according to claim 9, characterized in that a viewpoint is sequentially moved from a position above the indicated building, a birds-eye process is performed by using planar shape data of the buildings and the roads at each viewpoint position, and the detailed map image is gradually inclined on the basis of the shape data subjected to a birds-eye process to display the detailed map.

12. A location floor number display method in a navigation apparatus according to claim 9, characterized in that a compressibility factor is increased as the number of floors of the indicated building increases, and the building is displayed three-dimensionally with a height obtained by multiplying the compressibility factor by the number of floors of the building.

13. A location floor number display method in a vehicle navigation apparatus for displaying the floor number of a floor, in a building, on which a target institution is located, comprising the steps of:
- storing detailed map information including planar shapes of buildings and roads and storing building information including the number of floors of each building, user name(s) in a building, and the location floor number of the user(s);
- displaying on a display screen a detailed map including a building in which a target institution is located by pinpoint searching by using the detailed map information;
- thereafter, displaying user information of a building user serving as the target institution on a part of the display screen, displaying the detailed map on another part of the display screen such that the detailed map is inclined by an imaging process, and three-dimensionally displaying the building with a height corresponding to the number of its floors; and
- calculating the floor number of the floor on which the user is located from the building information, displaying the indicated building three-dimensionally and displaying the floor of the specified user such that the floor number can be identified, and/or displaying the floor number by characters.

14. A location floor number display method in a navigation apparatus according to claim 13, characterized in that a viewpoint is sequentially moved from a position above the indicated building, a birds-eye process is performed by using the planar shape data of the buildings and the roads at each viewpoint position, and the detailed map image is gradually inclined on the basis of the shape data subjected to a birds-eye process to display the detailed map.

15. A location floor number display method in a navigation apparatus according to claim 13, characterized in that a compressibility factor is increased as the number of floors of the indicated building increases, and the building is three-dimensionally displayed with a height obtained by multiplying the compressibility factor by the number of floors of the building.

16. A location floor number display method in a navigation apparatus according to claim 13, characterized in that, when a user is located in a basement, a location floor number in the basement is displayed by characters.

17. A vehicle navigation apparatus for displaying on a display screen the floor number of a floor, in a building, on which a building user serving as a target institution is located, comprising:

a map information storage medium for storing building information including road data, the shapes of buildings, the number of floors of each building, user(s) of a building, and a location floor number of the user(s);

an input device for indicating a building on a map displayed on a display screen; and a controller for calculating a user name list of a building indicated by said input device from the building information to display the user name list on the display screen, wherein, when a user is specified, said controller calculates the floor number of a floor on which the user is located from the building information, displays the indicated building three-dimensionally and displays the floor of the specified user, such that the floor number can be identified, and/or displays the floor number by characters.

18. A navigation apparatus according to claim 17, characterized in that said controller calculates the number of floors of an indicated building from said map information storage medium, generates the building with a height corresponding to the number of floors, and displays the building three-dimensionally.

19. A vehicle navigation apparatus for displaying on a display screen the floor number of a floor, in a building, on which a building user serving as a target institution is located, comprising:

a map information storage medium for storing building information including road data, the shapes of buildings, the number of floors of each building, user(s) of a building, and a location floor number of the user(s); and a controller for displaying on a display screen a map including a building in which a target institution indicated by pinpoint searching is located;

wherein said controller calculates the floor number of a floor on which the indicated target institution is located from the building information, displays the indicated building three-dimensionally and displays the floor of the specified user, such that the floor number can be identified, and/or displays the floor number by characters.

20. A navigation apparatus according to claim 19, characterized in that said controller generates the indicated building with a height corresponding to the number of floors and three-dimensionally displays the building.

21. A method of operating a vehicle navigation system, comprising:

displaying a map on a display screen of the vehicle navigation system;

selecting a user within a building located on the map; and displaying a three-dimensional representation of the building on the map.

22. A method of operating a vehicle navigation system according to claim 21, characterized in that the building user is selected by pinpoint searching.

23. A method of operating a vehicle navigation system according to claim 21, characterized in that the building user is selected from a user list associated with the building.

24. A method of operating a vehicle navigation system according to claim 21, characterized in that the floor location of the building user is displayed in relation to the building.

25. A method of operating a vehicle navigation system according to claim 24, characterized in that the display of the floor location of the building user is made by displaying the floor of the building user on the three-dimensional representation of the building and/or displaying the floor number by characters.

26. A vehicle navigation apparatus, comprising:

a map information storage medium;

a display screen for displaying a map;

an input device for selecting a user within a building located on the map; and a controller for displaying a three-dimensional representation of the building on the map.

27. A vehicle navigation apparatus according to claim 26, characterized in that the building user is selected by pinpoint searching.

28. A vehicle navigation apparatus according to claim 26, characterized in that the building user is selected from a user list associated with the building.

29. A vehicle navigation apparatus according to claim 26, characterized in that the controller displays the floor location of the building user in relation. to the building.

30. A vehicle navigation apparatus according to claim 29, characterized in that the controller displays the floor location by displaying the floor of the building user on the three-dimensional representation of the building and/or displaying the floor number by characters.

* * * * *